May 27, 1924.
Re. 15,850
J. J. TOOMEY
RANGE
Original Filed Sept. 23, 1922 2 Sheets-Sheet 1
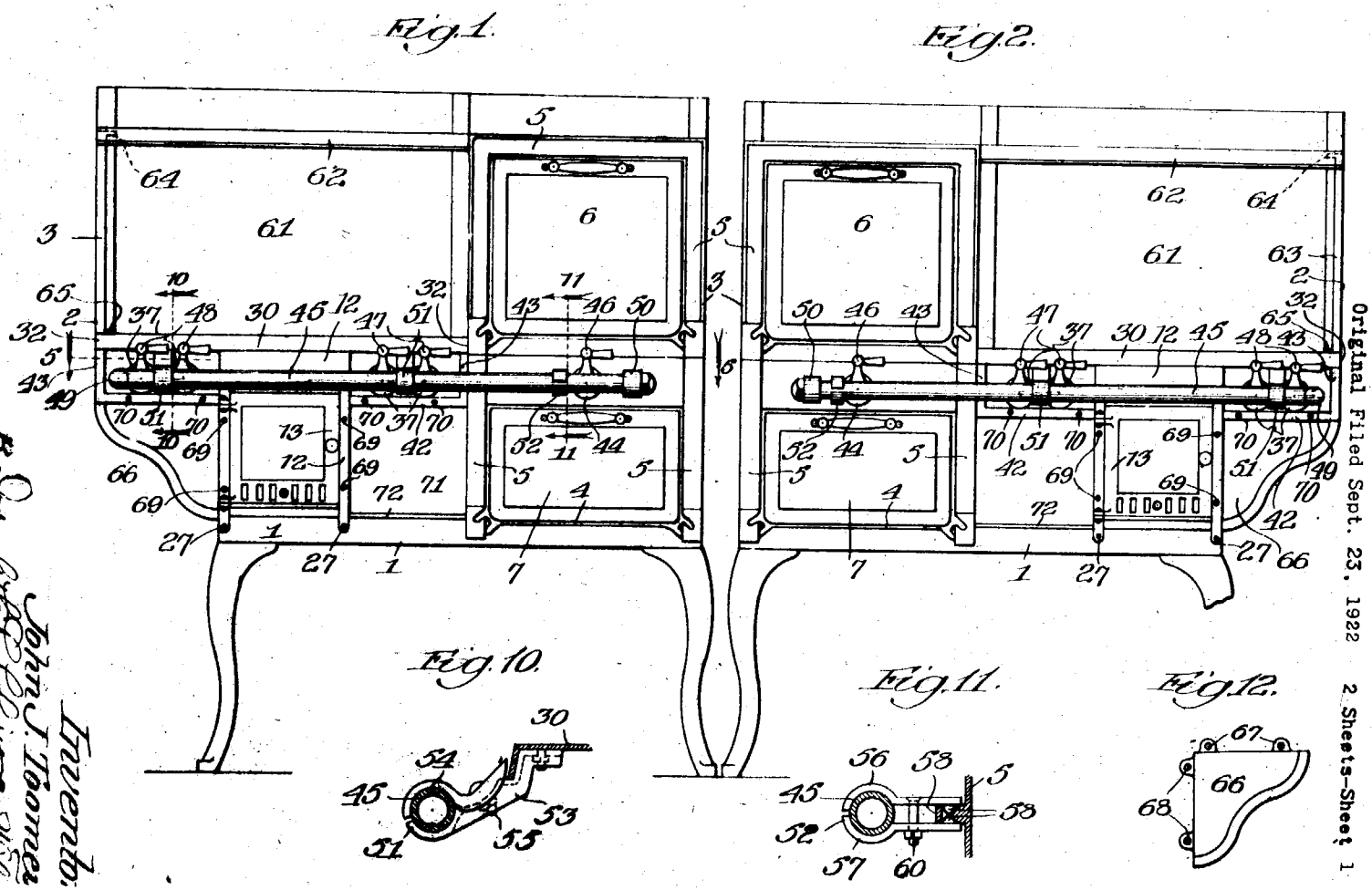
Inventor:
John J. Toomey
By Dyrenforth, Lee, Christy & Wilder,
Attys.

May 27, 1924. Re. 15.850
J. J. TOOMEY
RANGE
Original Filed Sept. 23, 1922 2 Sheets-Sheet 2
Fig. 3.
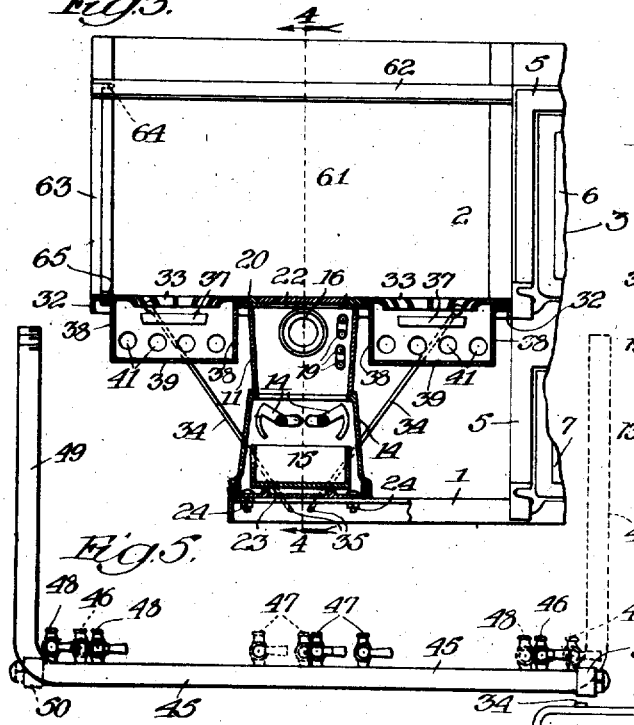
Fig. 4.
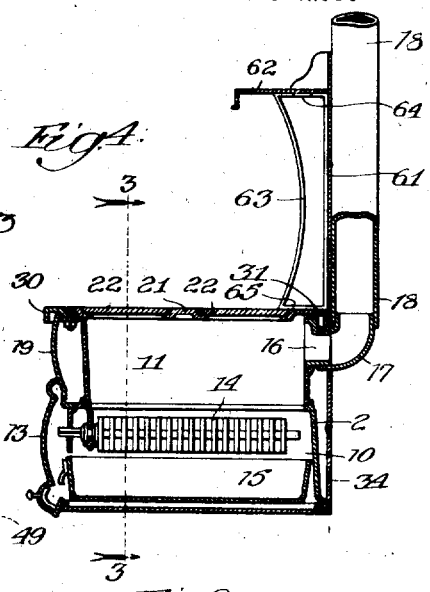
Fig. 5.
Fig. 8.
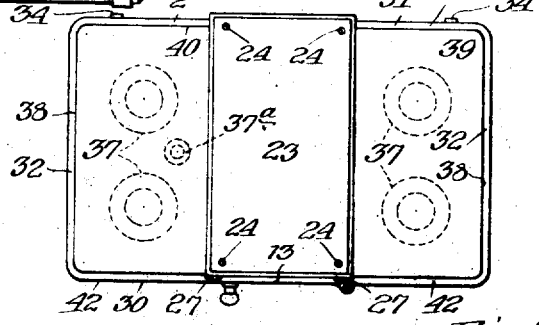
Fig. 6.
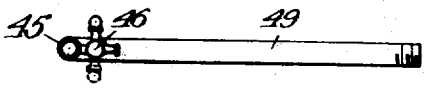
Fig. 7.
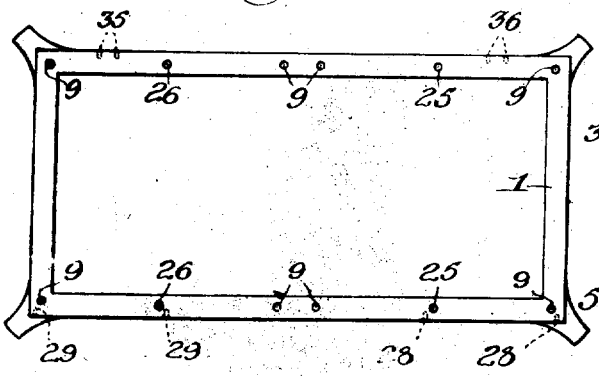
Fig. 9.
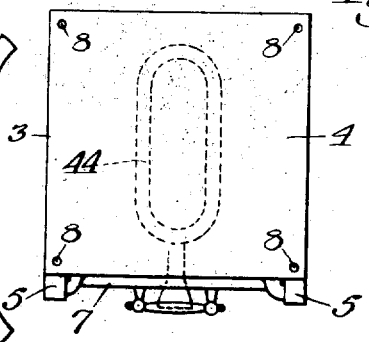
Inventor:
John J. Toomey,
By Dyrenforth, Lee, Christy & Wiles,
Attys.

Reissued May 27, 1924.

Re. 15,550

UNITED STATES PATENT OFFICE.

JOHN J. TOOMEY, OF CHICAGO, ILLINOIS.

RANGE.

Original No. 1,467,520, dated September 11, 1923, Serial No. 589,962, filed September 23, 1922. Application for reissue filed April 16, 1924. Serial No. 707,007.

*To all whom it may concern:*

Be it known that I, JOHN J. TOOMEY, a citizen of the United States, residing at Chicago, in the county of Cook and State of Illinois, having invented certain new and useful Improvements in Ranges, do hereby declare that the following is a full, clear, and exact description of the same, reference being had to the accompanying drawings.

The invention relates to ranges used for domestic cooking purposes, and its object is to provide an improved range in which a duplex-fuel cooking-top section and an oven section are respectively constructed in unitary organizations adapted to be interchangeably mounted on the same base, so that the same parts may be set up and utilized as either a right-hand or a left-hand oven duplex range. Such an embodiment having provision for interchangeably mounting the oven unit and the duplex-fuel cooking-top unit is the preferred embodiment; but, as will be explained later herein, the construction and arrangement of said units are such as to give highly important advantages, regardless of whether or not the units are interchangeably mounted so as to permit assembly to form either a right-hand oven or a left-hand oven stove.

The invention consists in the matters hereinafter described and then pointed out in the appended claims.

In the accompanying drawings which illustrate embodiments of my invention, Fig. 1 is a front view of a range exemplifying my invention organized with a right-hand oven and a left-hand duplex-fuel cooking-top; Fig. 2 is a similar view of a range with the same parts organized with a left-hand oven and a right-hand duplex-fuel cooking-top; Fig. 3 is a broken view partly in front elevation and partly in cross-section on the line 3—3 in Fig. 4; Fig. 4 is a longitudinal sectional view on the line 4—4 in Fig. 3; Fig. 5 is a detail view on the line 5—5 in Fig. 1 showing the reversible gas-manifold and its gas-burner valves in their two positions in full and dotted lines respectively; Fig. 6 is a detailed view of the gas-manifold with one of the burner valves shown in its two positions thereon in full and dotted lines respectively; Fig. 7 is a top plan view of the base; Fig. 8 is a bottom plan view of the duplex-fuel cooking-top section inverted with the gas-burners shown in dotted lines; Fig. 9 is a similar view of the oven section inverted; and Figs. 10, 11, and 12 are detailed views, Figs. 10 and 11 being sections taken as indicated, respectively, at lines 10—10 and 11—11 on Fig. 1.

The oven section 3 is constructed and organized as a unit, and comprises a suitable metallic body having top, side and rear walls, a metal bottom plate 4 and a cast-metal front frame 5, providing an upper baking oven and a lower broiling or toasting oven, which are separated from each other by the usual removable sheet-metal partition (not shown) arranged above the center-heat oven burner, and are provided with doors 6 and 7, respectively, whose frames are suitably hinged on appropriate portions of the front frame 5. All these parts are organized to comprise an oven unit which is capable of being bodily attached to and detached from the supporting base; in the form shown, this cabinet or oven unit is secured to the base by suitable removable bolts 8 arranged at the front and rear of its bottom plate and entering bolt holes 9 arranged in sets of four on opposite sides of the center of the front and rear rails of the base, as shown in Fig. 7, so that the oven-section can be mounted at either end of the base.

The duplex-fuel cooking-top section 2 is constructed as a unit, which also is capable of being bodily attached to and detached from either end of the base, interchangeably with the oven-section, so that the range is reversible. This cooking-top unit is organized in any suitable manner to provide a central solid-fuel portion and side portions having a different type of heating-units, preferably gas-burners. The solid-fuel portion comprises an ash-pit 10 and a fire-box 11 of usual rectangular form and assembled together in any suitable manner and having a cast-metal front frame 12 secured thereto provided with the usual opening in its lower portion to afford access to the interior, the door 13 for this opening being hinged to the frame 12. The ash-pit is provided with the usual grate-bars 14 and ash-pan 15, and the fire-box has the usual rear outlet 16 provided with an elbow 17 to connect with the flue-pipe 18, and may have suitable inlet and outlet passages for a hot-water coil 19. The fire-box has a cast-metal rectangular top 20 bolted to it and provided with the usual short-center 21 and a pair of standard solid-fuel cooking openings closed by lids 22. The cast ashpit bottom 23 is secured to the base 1 by removable bolts 24 arranged at its front and rear and entering bolt holes in the front and rear rails of the base; the outer lateral pair of bolts 24 enter the outer lateral pair of holes 9, and the inner lateral pair of bolts 24 enter holes arranged in opposite pairs 25 and 26, in the front and rear rails of the base, according as the section 2 is mounted at the right or left hand end of the base, the holes 25 and 26 being spaced inwardly or along the length of the base from the outer holes 9 in correspondence with the spacing of the front and rear bolts 24 from each other.

The front frame 12 is provided with lower ears 27 which are bolted to the base, the latter being provided at each end with a pair of bolt holes 28 and 29, respectively, the holes of each pair being spaced apart to register with the ears 27 when the section 2 is assembled on the corresponding end of the base. The section 2 is provided with a perimetral main top composed of a front rail 30, rear rail 31 and end rails 32, all preferably cast integral; the front and rear rails extend laterally at each side beyond the fire pot, as shown in Fig. 8, so that with the end rails 32 they form the tops of the burner-boxes on opposite sides of the fire-box. The front and rear rails of the main top are provided with inwardly extending depressed flanges to seat the ends of the fire-box top 20 and the ends and outer sides of the usual burner-box top grates or grids 33 flush therewith, and the sides of the top 20 are similarly constructed to seat the inner sides of the grids from front to rear. The front rail 30 is bolted to the upper end of the frame 12, and the rear rail 31 seats on the rear end of the fire-box. The frame of the cooking-top unit 2 is thus composed of the front-frame 12 of the solid-fuel portion and the main top of the burner-box, and is secured to the front rail of the base 1 by the ears 27. The rear rail 31 of the main top is secured to the rear rail of the base by a pair of angularly disposed braces 34; the upper ends of these braces are bolted to the rail 31 near its outer ends, and their lower ends are detachably bolted to the base-rail near its end corresponding to the right or left hand location of the unit 2 on the base, for which purpose the latter is provided with bolt-holes arranged in end pairs 35 and 36, as shown in Fig. 7, the holes of each pair being spaced apart on each side of the center line of the ash-pit when the latter is mounted above them as shown in Fig. 3. By this construction the braces for the main top are secured interchangeably in the holes 35 and 36 when the section 2 is reversely mounted in position at the corresponding end of the base. It is noteworthy that the solid-fuel section occupies a central position with respect to the assembly of the duplex-fuel cooking-top unit 2 and forms the main support for the super-structure of the unit symmetrically balanced thereon, as will be understood from Fig. 3. The braces 34 lend additional support and serve effectively to prevent racking of the structure. Additional advantages of the arrangement here described will be mentioned later. It may be stated, further, that the ash-pit affords a broadly based support for the fire-box, and the fire-box, which has its walls formed integrally with each other, affords, in turn, a staunch support for the main top-frame of the duplex cooking unit.

The section 2 is provided with a sectional burner-box having its section arranged at the sides of the fire-box to accommodate the grids 33 and burners 37, these boxes being organized in a unitary structure with the cast-metal front-frame 12 and other parts of the cooking-top unit, so that the duplex-fuel section is supported as a unit at its lower end on the base, and is secured in place by the bolts 24, ears 27 and braces 34. Each section of the burner-box is rectangular and formed with sheet-metal side walls 38, bottom 39 and rear wall 40 the latter having a series of air inlets 41 as shown in Fig. 3; these parts are suitably secured at their upper portions to the fire-box and main top, and each section is open at its front and has an L-shaped cast-metal front frame whose horizontal leg 42 is bolted to the front frame 12 and whose vertical leg 43 is secured to the side rail 32 of the main top, the parts being arranged with the burner-box spaced above the base and approximately in line with the upper portion of the broiler oven so that the burners 37 are in the horizontal plane of the oven burner 44, as shown for example in Figs. 1 and 2. The burners 37 comprise the usual giant burner and three regulation burners to afford the standard top-cooking capacity of the commercial gas-range; a simmering burner 37ª may be used, and all the burners are of the usual blue-flame type having integral air-mixers as indicated in Figs. 1 and 2. At the front of the burner-box and of the oven unit a gas-supply manifold 45 is reversibly mounted for supplying all the burners; it is provided with a valve 46 for the oven-burner and with two pairs of valves 47 and 48, respectively, for the burner-box burners. The manifold has an angular threaded supply pipe 49 constructed to pass back through the burner-box and out through the outer passage 41 in the rear wall thereof. The manifold is reversible so that the pipe 49 can pass through either end opening 41, and each of the valves is reversible on the manifold so that it can be given a half-turn thereon when the manifold itself is reversed. As shown in Fig. 1 the manifold is mounted for a left-hand burner-box, with its pipe 49 passing through the left-hand passage 41 of Fig. 3, and in this position of the parts the valves 48 control the burners 37 of the left-hand burner-box section, the valves 47 control the burners 37 of the right-hand burner-box section, and the valve 46 controls the oven-burner 44, and these valves and the manifold are disposed as shown in full lines in Fig. 5, their jets now being in register with the air-mixers of the burners as shown in Fig. 1. On the other hand, when the burner-box is mounted at the right-hand end of the base as shown in Fig. 2 the manifold is detached from its full-line position shown in Figs. 1 and 5 and is turned over end on end and mounted in the position shown in Fig. 2 and in dotted lines in Fig. 5 with its supply pipe 49 passing through the right-hand passage 41 of Fig. 3, thus bringing the valve 46 at the burner 44, the valves 47 at the burners 37 of the left-hand burner-box section and the valves 48 at the burners 37 of the right-hand section thereof as shown in Fig. 2 and in dotted lines in Fig. 5, their jets now being in register with the air-mixers of the burners as shown in Fig. 2. Each valve is mounted on the manifold so that it can be bodily given a half-turn thereon, as shown in Fig. 6, so that when the manifold is turned over end for end each valve can be turned or rotated bodily half way over on the manifold to bring its handle at the top of the manifold. The free end of the manifold is closed by a cap 50, and suitable brackets 51 and 52 are provided respectively on the front rail 30 of the main top and on the frame 5 of the oven to detachably support the manifold; in practice these brackets are composed of separable portions which are suitably carried on the frame 5 and rail 30 and are clamped around the manifold to securely hold it in either of its positions. Fig. 10 shows a detail of the bracket 51 in which the hanger 53 is bolted to the front rail 30 and projects forward into the line of the manifold, and the clamp 54 is detachably secured by a bolt 55 on the hanger 53, the manifold being held between their curved outer ends. Fig. 11 shows a detail of bracket 52 in which each of the opposite parts 56 and 57 has marginal spacing flanges and a central inner lug 58 adapted to enter a hole in a projection 59 cast on the front of the frame 5, and these parts are locked in position on the lug by a bolt 60, the manifold being held between their forwardly projecting outer ends. To reverse the manifold it is only necessary to remove the three top pieces of these brackets.

The duplex-fuel section is provided with an upright rear splasher or back guard 61 having a shelf 62, and a reversible end bracket 63 having flanges 64 and 65 at its opposite ends by which it is attached to one of the side rails 32 of the main top and to the shelf 62, this bracket being reversed or turned end on end when it is assembled respectively on a right or left hand burner-box as shown in Figs. 2 and 1.

The duplex-fuel section carries a reversible end panel 66 which is angular in contour and carries pairs of lugs 67 and 68 on its adjacent edges by which it is interchangeably bolted to the frame 12 and a leg 42 of the burner-box frame, which are provided with suitable holes 69 and 70, respectively. The panel is thus reversible to fit either side of the stove as shown in Figs. 1 and 2, being given a quarter turn to reverse its position. There is a space below the inner burner-box section and between the coal heater and the oven in either position of the two units which forms a warming chamber 71; a removable plate 72 closes the bottom of this chamber in either relation of the units, and its rear end is closed by a suitable panel (not shown). The fire-pot forms one side of this chamber 71 and being exposed radiates considerable heat, so that the chamber is properly warmed in either position of the units.

When the range is to be used with the oven located at the right-hand side as in Fig. 1, the oven or cabinet unit is mounted on the right-hand end of the base with its bolts 8 in engagement with the right-hand set of four bolt-holes 9 in the base shown in Fig. 7, and the duplex-fuel cooking-top unit is mounted on the left-hand end of the base with the bolts 24 of its solid-fuel portion in engagement with the bolt-holes 26 and the outer lateral holes of the left-hand set 9; the braces 34 engage the holes 35, and the ears 27 of the front-frame are bolted to the base at 29. When the range is to be used with the oven located at its left-hand side as in Fig. 2, the oven or cabinet unit is mounted on the left-hand end of the base with its bolts 8 in engagement with the left-hand set of four bolt-holes 9 in the base shown in Fig. 7, and the cooking-top unit is mounted on the right-hand end of the base with its bolts 24 in engagement with the bolt-holes 25 and the outer lateral holes of the right-hand set 9; the braces 34 engage the holes 36, and the ears 27 are bolted to the base at 28. In either case the other parts are assembled as disclosed and a complete range having standard oven equipment and a duplex-fuel cooking-top of standard capacity for both kinds of fuel is provided.

By organizing the duplex-fuel unit with the solid-fuel portion between the sections of the open-front burner-box and constructed to be supported at its lower end on the base, it is possible to place this unit flush against either a right or left hand oven similarly supported on the base and so to standardize the units for interchangeable relation and enable the duplex-fuel range to be changed from a right to a left hand oven and vice versa without using any extra parts, and in either case the gas burners in the burner-boxes are in line with the oven burner and all the burners and the hard-fuel heater can be used at the same time and a warming chamber is provided. This interchangeable feature is important and advantageous to the manufacturer, the dealer and the user. By my invention the manufacturer is required to make and carry in stock only a single supply or line for both right and left hand oven duplex-fuel ranges and can dispense with the expensive duplicate patterns, molds and operations required for the different kinds; all his appliances and operations are standardized and limited to a single line or type, and all his supply can be mounted and shipped out in either form or in both forms as desired. Also, the dealer or retail merchant need not carry separate stocks of right and left oven duplex-fuel ranges, but can limit his stock to a single line and can fill orders from users for either right or left oven ranges. Further, the user can utilize the same duplex-fuel range in kitchens where the plan or equipment makes it desirable to have either a right or left oven range set in one or another particular location; the range can be appropriately set up without requiring an exchange or the purchase of additional parts. Also, considerable floor space is saved as my range can be set with its cooking top against a wall of the kitchen as the outer burner-box section spaces the fire-box far enough from the wall to prevent damage; and the fire-box is exposed all around and permits the heat to radiate from both its sides, so that the hard-fuel section is doubly serviceable for heating the kitchen, and a warming chamber is provided in either arrangement of the sections. By my invention the duplex-fuel range can be set with its cooking top end against the wall to save floor space, and it affords radiation of heat on both sides of the hard fuel portion, and a complete duplex-fuel cooking range and kitchen heater reversible for either right or left hand oven is provided as one unit.

An additional advantage which inheres in the relation of the sections of the duplex-fuel cooking-top to each other is that space is gained by the interposition of the solid-fuel section top between the flanking grids which are disposed above the non-solid-fuel burners, or elements. This enables larger vessels to be placed over the burners and enables the handles of vessels to project over the solid-fuel section top—a result not attainable (assuming the same sized sections) where the interposition of the solid-fuel section is not employed.

The gas burners are merely typical of a convenient form of heating unit for the cooking top and the ovens, as these parts may have heaters of any suitable type, as for example by placing electric heating units where the gas-heating units are shown.

This application is a continuation in part of my co-pending application filed July 2, 1921, bearing Serial Number 482,130.

I claim:

1. In a cooking range, a base; a duplex-fuel cooking-top section, comprising a central fire-box, a sectional open-front burner-box having heating elements therein, a main top and a front frame organized as a unitary construction capable of bodily attachment to either end of the base: an oven-section comprising a body providing oven space and oven-burner space organized as a unitary construction capable of bodily attachment to either end of the base; and means to detachably connect the lower ends of the fire-box and oven-body to the base in interchangeable relation thereon to constitute a right or left oven range.

2. In a cooking range, a base; a duplex-fuel cooking-top section comprising a central fire-box, a sectional open-front burner-box, gas-burners therein, a main top and a front frame organized as a unitary construction capable of bodily attachment to either end of the base, an oven-section comprising a body providing oven space and oven-burner space and organized as a unitary construction capable of bodily attachment to either end of the base; a gas-manifold reversibly mounted on the units and provided with reversible valves; and means to detachably connect the lower ends of the fire-box and oven body to the base in interchangeable relation thereon to constitute a right or left oven gas range.

3. In a cooking range, a base; an open cooking-top section comprising a fire-box and ash pit, a sectional open-front burner-box having its sections at the sides of the fire-box, gas burners therein, a main top and a front frame organized as a unitary construction capable of bodily attachment to either end of the base: an oven-section comprising a body providing a baking oven and a broiling oven with space for an oven gas-burner and organized as a unitary construction capable of bodily attachment to either end of the base; a reversible gas-manifold provided with reversible valves; means to detachably connect the ash-pit and oven body to the base in interchangeable relation thereon to constitute a right or left hand oven range; and brackets on the units to support the gas-manifold in alinement with the burners in either of the positions of the parts.

4. In a cooking range, a base; an open cooking-top section comprising a fire-box, a sectional open-front burner-box having its sections at the sides of the fire-box, gas burners therein, a main top and a front frame organized as a unitary construction capable of bodily attachment to either end of the base; an oven-section comprising a body providing oven space and oven-burner space and organized as a unitary construction capable of bodily attachment to the base; means to detachably mount the units on the base in interchangeable lateral relation to form a right or left oven gas range; a reversible gas-manifold provided with reversible valves and having a unitary gas supply pipe constructed to extend rearwardly through either section of the burner box, and separable brackets on the units to support the gas-manifold in alinement with the burners in either of the positions of the parts.

5. In a cooking range, a base; an open cooking-top section comprising a central fire-box, a sectional open-front burner-box, gas-burners therein, and a front frame organized as a unit capable of being bodily shifted from one end of the base to the other; an oven-section comprising a body providing a baking oven and a broiling oven and a gas burner organized as a unit capable of being bodily shifted from one end of the base to the other; a gas manifold for the units; means to detachably mount the lower ends of the fire-box and oven body on the base in interchangeable relation to provide right and left oven ranges, each having a warming chamber between the fire-box and broiling oven, and a reversible end panel constructed to engage the frame on the opposite side of the fire-box.

6. In a cooking range, a base; a duplex-fuel cooking-top section comprising a central solid-fuel portion constructed to seat at its lower end on either end of the base, a sectional open-front burner-box spaced above the base and having heating elements therein, and a frame composed of a main top for the burner-box and a front frame for the solid-fuel portion, organized as a unitary construction capable of bodily attachment to either end of the base; an oven section comprising a body providing oven space and oven-burner space and organized as a unitary construction capable of bodily attachment to either end of the base adjacent the inner burner-box section to provide a warming chamber thereunder; a gas-manifold for the units, and means to detachably connect the lower ends of the cooking-top section and oven-body to the base in interchangeable relation to constitute a right or left oven range.

7. In a cooking range, a base; an open cooking-top section comprising a central fire-box, a sectional open-front burner-box, gas-burners therein, a main top and a front frame organized as a unit capable of being bodily shifted from one end of the base to the other; an oven-section comprising a body providing a baking oven and a broiling oven and an oven gas burner organized as a unit capable of being bodily shifted from one end of the base to the other; a gas manifold for the units; means to detachably mount the fire-box and oven body on the base in interchangeable relation to provide right and left oven ranges, and a pair of angular braces fastened to the rear portion of the main top near its ends and detachably engaging the rear portion of the base at either end thereof.

8. In a cooking range, a base having bolt-holes arranged in sets of four on opposite sides of the center of its front and rear portions; a cooking-top section comprising a central fire-box, a sectional open-front burner-box, gas burners therein, and a front frame organized as a unit capable of being bodily shifted from one end of the base to the other; an oven-section comprising a body providing a baking oven and a broiling oven and an oven gas burner organized as a unit capable of being bodily shifted from one end of the base to the other; a gas manifold for the units; the fire-box and oven-body having bolt-holes to register with the bolt-holes in the base in interchangeable relation to receive bolts to connect the parts to provide right and left oven ranges.

9. In a cooking range, a base having bolt-holes arranged in sets of four on opposite sides of the center of its front and rear portions and having bolt-holes arranged in opposite pairs intermediate the first bolt-holes; a cooking-top section comprising a central fire-box and lateral open-front burner-boxes, organized as a unit capable of being bodily shifted from one end of the base to the other; an oven-section comprising a body providing oven space and oven-burner space and organized as a unit capable of being bodily shifted from one end of the base to the other; the oven-body having bolt-holes arranged to register with said sets of bolt-holes in the base in interchangeable relation, and the fire-box having bolt-holes arranged to register with the outer holes of said sets and with said intermediate holes, to receive bolts to connect the parts to provide right or left oven ranges.

10. In a cooking range, a base; a cooking-top section comprising a central hard-fuel portion, lateral open-front burner-boxes, and gas-burners in the boxes, organized as a unit capable of being bodily mounted on either end of the base; an oven-section comprising a body providing upper and lower ovens and an oven gas burner in alinement with the burner-box burners and organized as a unit capable of being bodily mounted on either end of the base; means to detachably connect said sections to the base in interchangeable relation to form a right or left oven range; a reversible gas-manifold having a plurality of reversible valves for the burner-box burners and a single reversible valve for the oven burner, and brackets to support the manifold in alinement with the burners in either of the positions of the parts.

11. A range of the character set forth, comprising: a base-frame; an oven unit mounted on one end thereof; and a duplex-fuel cooking-top unit mounted on the other end of said base-frame, comprising a central solid-fuel section secured on the base-frame, a top-frame having its central portion surmounting said solid-fuel section and having its ends projecting beyond the sides of the solid-fuel section, one of the projecting ends extending to the oven unit, a central top-plate surmounting the solid-fuel section and the central portion of said top-frame, grids supported on said top-frame and flanking said central top-plate, and heating-elements disposed beneath said grids, the space between said solid-fuel section and said oven unit being adapted to serve as a warming-chamber.

12. A range of the character set forth, comprising: a base-frame; an oven unit mounted on one end thereof; and a duplex-fuel cooking-top unit mounted on the other end of said base-frame, comprising a central solid-fuel section mounted on the base-frame and having a front plate secured at its lower end to said base-frame; a perimetral top-frame having its central portion surmounting said solid-fuel section, the front rail of said top-frame being secured to said front plate, said perimetral top-frame having its ends projecting beyond the sides of the solid-fuel section, one of the projecting ends extending to the oven unit, a central top-plate surmounting the solid fuel section and secured to the central portion of said top-frame, said central top-plate having holes therein equipped with lids, grids supported on said top-frame and flanking said central top plate, heating elements disposed beneath said grids, and walls disposed beneath said heating elements, the space between said solid-fuel section and said oven unit being adapted to serve as a warming chamber.

13. A range of the character set forth, comprising: a base-frame; an oven unit mounted on one end thereof; and a duplex-fuel cooking-top unit mounted on the other end of said base-frame, said last-named unit comprising a central solid-fuel section mounted on the extremity of the base-frame, a top-frame having its central portion surmounting said solid-fuel section and having its ends projecting beyond the sides of the solid-fuel section, one of the projecting ends extending to the oven unit and the other projecting end extending beyond the end of the base-frame, a central top-plate surmounting the solid-fuel section and the central portion of said top-frame, grids supported on said top-frame and flanking said central top-plate, heating elements disposed beneath said grids, and a bottom plate on said base-frame between the bottom portion of the solid-fuel section and the base-portion of said oven unit, the space between said solid-fuel section and said oven unit being adapted to serve as a warming chamber.

14. A range of the character set forth, comprising: a base-frame; an oven unit mounted on one end thereof; and a duplex-fuel cooking-top unit mounted on the other end of said base-frame, said last named unit comprising a central solid-fuel section secured on the extremity of said base-frame, a top-frame having its central portion supported on said solid-fuel section and having its ends projecting beyond the sides of said solid-fuel section, one of the projecting ends extending to the oven unit and the other extending beyond the end of said base-frame, a central top-plate surmounting the solid-fuel section and secured thereto and to said top-frame, grids supported on said top-frame and flanking said central top-plate, heating elements disposed beneath said grids, and upwardly divergent braces having their lower ends secured to the rear rail of said base-frame and having their upper ends secured to the rear rail of said top-frame.

15. A range of the character set forth, comprising: a base-frame, provided with front and rear rails and end rails; an oven unit comprising a pair of ovens superposed one above the other, said oven unit being mounted on one end of said base-frame; and a duplex-fuel cooking-top unit mounted on the other end of said base-frame, said last-named unit comprising a central solid-fuel section secured on the base-frame, a perimetral top-frame having its central portion supported on and secured to said solid-fuel section, said solid-fuel section being equipped with a top-plate provided with holes and grids therefor, and said perimetral top-frame having its ends projecting beyond the sides of the solid-fuel section, one of the projecting ends extending to the oven unit at about the plane of the junction between the ovens comprising said oven unit and the other end of said top-frame extending past the end of said base-frame, grids supported on said top-frame and flanking the top-plate of said solid-fuel section, heating elements disposed beneath said grids, and a plate supported on said base-frame between the base portion of the solid-fuel section and the base portion of the oven unit, the space above said plate and between said solid-fuel section and said oven unit being adapted to serve as a warming chamber.

JOHN J. TOOMEY.